Patented May 31, 1949

2,471,945

UNITED STATES PATENT OFFICE 2,471,945

WETTING AGENT

Hans George Figdor, Philadelphia, Pa., assignor to E. F. Houghton and Company, Philadelphia, Pa., a corporation of Pennsylvania No Drawing. Application August 15, 1947, Serial No. 768,937

13 Claims. (Cl. 252—352)

The present invention relates to novel surface-active compositions, and more particularly it relates to compositions comprising a blend of two components which cooperate with each other to produce a product possessing unexpected superior wetting and penetrating properties.

Such surface-active agents, commonly referred to as wetting agents, are very useful in many industries, for example, in the textile industry as dye-leveling agents, carbonizing assistants, controlled-shrinkage assistants, and the like. The wetting agents on the market today are generally classified into three groups: anionic, cationic, and non-ionic materials. While some of these agents are highly efficient, that is, they perform well at very low concentrations, they are also relatively expensive. On the other hand, the less expensive materials are relatively less efficient, that is, they must be present in higher concentrations to perform satisfactorily.

It is, therefore, an object of the present invention to provide highly efficient wetting agents from relatively inexpensive raw materials.

A further object of the present invention is to greatly enhance the efficiency of known wetting agents.

Another object is to combine certain diesters of polyethylene glycols of limited water-compatibility with water-soluble surface-active agents of anionic, cationic, or non-ionic nature, to provide water dispersible compositions of unexpectedly improved wetting and penetrating properties.

Other objects will appear hereinafter from a consideration of this specification and the claims.

The wetting agent of the present invention comprises a blend of a water-soluble surface-active agent of the anionic, cationic, or non-ionic type and a diester of a polyethylene glycol represented by the following formula:

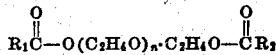

wherein $n$ is a number from 5 to 22, inclusive, $R_1$ and $R_2$ are unsubstituted, saturated alkyl groups, straight or branched chain, the number of carbon atoms in $R_1$ plus the number of carbon atoms in $R_2$ being from 12 to 16, inclusive, and the difference between the number of carbon atoms in $R_1$ and in $R_2$ being no more than 4.

The novel wetting composition of the present invention is prepared by mixing the polyethylene glycol diester and the water-soluble surface-active agent selected from the group consisting of anionic, cationic, or non-ionic surface-active agents. The resulting mixture is a blend as distinguished from a reaction product of the two components. While the water-soluble surface-active agent employed in the composition will possess surface activity by itself, it has been found that by blending the polyethyleneglycol diester therewith, the wetting and penetrating power of the resulting blend is many times greater. This enhancement of these properties was not to be expected as the polyethyleneglycol diesters used in the composition of the present invention have limited hydrophilic properties (water-compatibility). This limited water-compatibility of the diesters makes them of little value as wetting agents.

The polyethyleneglycol diesters used in the present invention, as stated, exhibit, as a class, limited water-compatibility even at room temperature and less water-compatibility as the temperature is raised to that normally employed for wetting, penetrating, and the like purposes, for example, from 100° F. to approximately 200° F. Thus, while the esters dissolve in a limited amount of water, the solution upon further dilution will become cloudy and upon still further dilution the diester will separate as an oil. Similarly, a rise in temperature may cause cloudiness or separation of the diester.

The presence of the water-soluble surface-active agent in the composition with a diester, of the type that possesses only limited water-compatibility, serves to increase the water-compatibility of the diester. While, as will hereinafter be discussed, certain of the diesters are more hydrophillic than others, the presence of the water-soluble surface-active agent with any particular diester will increase its water-compatibility to a very marked extent so that its stability to dilution is much greater than would otherwise be possible. For example, even in the case of the diesters of the least water-compatibility, the water-soluble surface-active agent functions therewith to provide a composition which can be used in the relatively low concentrations, for example, between about 2% and about 0.01%, and at the temperatures normally employed for the treatment of materials with wetting agents. Furthermore, as stated, the wetting and penetrating properties of the composition of the present invention are greatly increased, as compared either to those of the water-soluble surface-active agent, or to those of the diester, and are markedly greater than was to be expected from a knowledge of the wetting and penetrating properties of the two components; in other words a much more efficient wetting agent is provided.

Referring more specifically to the diester of polyethyleneglycol employed in accordance with the present invention, it is seen from the formula given above that the alcoholic component of the diester is a polyglycol of a chain length of from 6 to 23 recurring ethylene oxide ($C_2H_4O$) units. Such polyethyleneglycols represent an average molecular weight of from about 300 to about 1,000. As stated, the alkyl ester groups represent a total of from 12 to 6 carbon atoms exclusive of the carbon atoms in each carboxyl group, while the difference in chain length between the ester groups does not vary by more than 4 carbon atoms. Thus, the ester groups $R_1$ and $R_2$ may contain the same number of carbon atoms in which case $R_1$ and $R_2$ will at the same time contain either 6, 7 or 8 carbon atoms. On the other hand, the ester groups $R_1$ and $R_2$ may differ from each other by 1, 2, 3, or 4 carbon atoms, but, as stated the total carbon atoms in the ester groups, represented in the formula by $R_1$ and $R_2$ will not be less than 12 nor greater than 16.

The polyglycol diesters used in the preparation of the wetting composition of the invention may be prepared by any desired method, now known or later developed in the art, for example, the diester may be prepared from the polyglycol and the free fatty acid, with or without a dehydrating catalyst; from the polyglycol and the halide of the fatty acid; and from the polyglycol and a low molecular weight ester of the fatty acid by the so-called "ester interchange" method. Since diesters are used in the composition, the reaction to form the polyglycol ester will involve one mol of the polyglycol and two mols of the material furnishing the acyl groups. It is not necessary to achieve complete esterification for the purpose of the invention, for example, an ester which contains approximately 5% to 10% of free fatty acid is satisfactory for use.

Examples of the fatty acids which may be reacted with the polyglycols, either as such or in the form of the halide or low molecular weight ester or otherwise, are caprylic; pelargonic; ethyl hexylic; caproic; capric; ethyl butyric; dipropyl acetic; delta isopropyl valeric; isoamyl acetic; n-heptylic (oenantic); valeric; isovaleric; isobutyl ethyl acetic; isoamyl butyl acetic and undecylic. In addition to the acids listed, any other material may be used to provide $R_1$ and $R_2$ within the limits stated in the formula. The material or materials furnishing the $R_1$ and $R_2$ groups need not be pure, for example, it is not necessary to use a chemically pure fatty acid, but commercial acids, for example, commercial caprylic acid, which is prepared from cocoanut oil and contains small amounts of other fatty acids, may be used in the preparation of the diester.

The polyglycol reacted with the material or materials which provide the $R_1$ and $R_2$ in the compound may, as shown by the formula, be any polyglycol of 6 to 23 recurring $C_2H_4O$ units and the polyglycol may be a mixture of such polyglycols and may contain amounts of polyglycols of fewer or greater $C_2H_4O$ units providing the mixture averages between 6 and 23 units. Typical examples of such polyglycols are those whose $C_2H_4O$ units are such that the average molecular weight is about 300, 400, 600 and 1,000, namely $C_2H_4O$ units averaging 6, 9, 13, and 23. Preferably, the diester will contain on the average of from 9 to 13 recurring ethylene groups.

Using hexaethyleneglycol as typical, although as made clear above, any other polyglycol furnishing the necessary $C_2H_4O$ units may be used in place thereof, the following compounds are illustrative of the diesters used in preparing the composition of the invention: hexaethylene glycol-dicaprylate, hexaethylene glycol-di-pelargonate, hexaethylene glycol-di-2-ethyl-hexylate, hexaethylene glycol-caprylate-2-ethyl-hexylate, hexaethylene glycol - caprylate-pelargonate, hexaethylene glycol-2-ethyl hexylate-pelargonate, hexaethylene glycol - caproate - caprate, hexaethylene glycol - 2 - ethylbutyrate - pelargonate, hexaethylene glycol - 2 - ethylbutyrate - caprate, hexaethylene-glycol-2-ethylbutyrate - caprylate, hexaethylene glycol-2-ethylbutyrate - 2 - ethyl hexylate, hexaethylene glycol di-(dipropyl acetate), hexaethylene glycol-di-(delta isopropyl valerate), hexaethylene glycol di-(isoamyl acetate), hexaethylene glycol-heptylate-undecylate, hexaethylene glycol - isovalerate - pelargonate, and hexaethylene glycol-diheptylate. Other examples are those in which polyethylene glycols having an average molecular weight of 400, 600 and up to 1000 are used in place of the hexaethylene glycols used in preparation of the diesters above set forth. Obviously, combinations of two or more of the diesters may be employed with the water-soluble surface-active agents.

Referring to the surface-active agents employed in the composition of the present invention, they, as stated, may be any water-soluble anionic, cationic, or non-ionic compound or material having surface-active properties. Examples of anionic surface-active agents in the form of water-soluble salts are: soaps, such as potassium palmitate, triethanolamine oleate, morpholine stearate, sodium laurate, and ammonium myristate; alkyl benzene sulphonates, such as sodium dodecyl-, keryl-, or tridecyl-benzene sulphonates; alkyl diphenyl sulphonates, such as sodium butyl diphenyl sulphonate; alkyl naphthalene sulphonates, such as sodium diisopropyl naphthalene sulphonate, ammonium diamyl naphthalene sulphonate, sodium mononyl naphthalene sulphonate, sodium isopropyl isobutyl naphthalene sulphonate, and sodium dinonyl naphthalene sulphonate; sulphated aliphatic alcohols such as sodium hexadecyl sulphate, sodium oleyl sulphate, triethanolamine dodecyl sulphate, sodium 3-9-diethyl 6-tridecanol sulphate, sodium 2-methyl 7-ethyl 4-undecanol sulphate, and sodium 2-ethyl 1-hexanol sulphate; sulphated and sulphonated fatty oils, acids or ester, such as the sodium salt of sulphonated castor oil, the sodium salt of sulphated red oil, the sodium salt of sulphonated butyl oleate, and the sodium salt of sulphonated isopropyl oleate; alkyl sulpho phthalates, such as sodium hexadecyl sulpho phthalate; sulphated amides, such as sulphated hydroxy-ethyl lauramide and sulphated hydroxy-isopropyl palmitamide; sodium salt of lauryl sulpho acetate; sodium salt of dioctyl sulpho-succinate; sodium salt of oleyl methyl tauride; sodium salt of sulphonated dodecyl benzoate, and the like. Examples of non-ionic surface active agents are: partial esters of polyhydric alcohols, such as nonaethylene glycol monolaurate, and tricosaethylene glycol monolaurate; condensation products of alkyl phenols with ethylene oxide such as the reaction product of isooctyl phenol with 12 ethylene oxide units; condensation products of alkyl thiophenols with 10 to 15 ethylene oxide units; condensation products of higher fatty alcohols with ethylene oxide such as the reaction products of oleyl alcohol with 10 to 15 or more ethylene oxide units; ethylene oxide addends of monoesters of hexahydric alcohols and inner ethers thereof such as sorbitan monolaurate, sorbitol monooleate and mannitan monopalmitate; the non-ionic reaction products of fatty acids, or their derivatives, with at least two molecules of hydroxylated amines as described in Patent No. 2,089,212; and the like. Examples of cationic surface-active agents are: salts of primary, secondary, and tertiary amines, such as oleyl amine acetate, dodecyl amine acetate, dioctyl amine lactate, stearoyldiethanolamine acetate, and dilauroyl triethylene-tetramine diacetate; and quarternary salts, such as lauryl pyridinium bromide, octodecyl ethyl morpholinium chloride, lauroyl-oxyethyl di-(hydroxy ethyl) ethyl ammonium ethyl sulphate, oleyloxyethyl trimethyl ammonium ethyl sulphate, dodecyl trimethyl ammonium chloride, and the like.

In preparing the composition, the water-soluble surface-active agent and the polyethyleneglycol diester may be mixed in any desired manner and, if desired, the composition prepared for sale may be substantially anhydrous or may contain water, for example, up to 60% or more. The composition when employed as a wetting agent will, of course, be diluted to provide a solution of relatively low concentration of the surface-active components, for example, 2% to 0.01%. The composition may also contain other substituents, for example, inorganic salts, either added as such or accompanying the water-soluble surface-active agent. Thus, if the water-soluble surface-active agent contains an inorganic salt, such as sodium sulphate, as the result of its method of preparation, the salt may remain in the blend of the invention or it may be separated by appropriate procedures from the surface-active agent either before or after mixing with the polyethylene glycol diester.

As stated above, the blend of polyethylene glycol diester and water-soluble surface-active agent provides a surface-active composition of greatly enhanced and superior properties, making it especially valuable for wetting, penetrating, and like purposes. As also stated, the diesters, which are normally relatively incompatible with water at low concentrations, become much more hydrophilic in the presence of the water-soluble surface-active agent, so that the diesters will remain dispersed in much greater dilutions than would otherwise be possible. Likewise, the diester will be much less likely to separate from the aqueous phase when the temperature is raised, for example, to 100° F. or higher. While the diesters used in the composition of the invention are, as a class, of limited compatibility, some of the diesters possess less hydrophilic properties than others. For example, the longer the polyethylene oxide chain of the diester, the more hydrophilic will be the diester, but even in this case, the water-compatibility is limited and the water-soluble surface-active agent functions to increase substantially the water-compatibility of the diester. Thus, regardless of the degree of the water-incompatibility of the diester alone, the composition comprising the blend of diester and water-soluble surface-active agent will have greatly enhanced water dispersibility, and the presence of the water-soluble surface-active agent in appropriate proportions in the blend will provide a composition which may be diluted to concentrations less than 2% and down to 0.01% with assurance that the diester will not separate from the solution at the temperatures of treatment, usually 100° F. to 200° F., of materials with the composition. While any water-soluble surface-active agent may be used, one characterized by high hydrophilic properties is preferred for use in the composition. Of the three classes of water-soluble surface-active agents, the use of an anionic or non-ionic surface-active agent is generally preferred, rather than a cation-active agent.

The relative proportions of the water-soluble surface-active agent may vary over a wide range, and even as small an amount as 10% of the diester in the blend of diester and surface-active agent will provide increased wetting activity. In most instances, the increase in wetting activity begins to be most marked when the diester makes up about 20% of the total weight of the two compounds. The blend will therefore contain at least 10% of the diester to 90% of the water-soluble surface-active agent and the amount of the diester in the blend may be increased up to about 95% in those cases where a composition, which is dispersible in water at concentrations less than 2% and at a temperature of at least 100° F., results. The minimum proportion of the water-soluble surface-active agent which may be incorporated in the blend to provide a composition of the stated dilutability operative at the stated temperature depends to some extent on the particular diester and water-soluble surface-active agent employed and will not be substantially less than 5%. For example, generally speaking, when a given water-soluble surface-active agent is employed, the minimum amount of the agent required will be in inverse ratio to the length of the polyethylene-oxide chain of the diester. Thus, whereas 5% of a particular surface-active agent when used with a polyethyleneglycol diester of an average chain length of 23 recurring ethylene oxide units may be sufficient, larger amounts, for example, 20%, may be required when the polyethyleneglycol diester has an average chain of 6 recurring ethylene oxide units. Generally also, the polyethyleneglycol diesters containing branched chain acid residues will require more water-soluble surface-active agent than will a compound having straight chain acid residues. The amount of water-soluble surface-active agent required to obtain the desired dispersibility of the composition will also depend to some extent on the hydrophilic properties of the agent; that is to say, the amount of an agent having relatively high hydrophilic properties which will be required will be less than that required when a surface-active agent of less hydrophilic properties is selected.

No difficulties will be presented in preparing a blend of the requisite properties to provide a composition capable of being used in the desired dilution and at the desired temperature. The relative proportion of diester to water-soluble surface-active agent in the composition will be adjusted so that the composition will be dispersible in water at the desired concentration and temperature; that is to say, the diester will not separate in any appreciable amount, as an oil, when the composition is used as a wetting agent. The treating solutions may be opalescent, but in the preferred embodiment, the relative proportions of the two components are adjusted so that the solution will remain clear in the dilution desired and at the temperature of treatment.

From the foregoing, it will be clear that the diester and water-soluble surface-active agent may be present in the composition in an amount between 10% of the diester to 90% of the water-soluble surface-active agent and about 95% of of the diester to about 5% of the surface-active agent to provide a composition which is dispersible in water at concentrations less than 2% and at a temperature of at least 100° F. Advantageously, the relative proportions will be between 20% of the diester to 80% of the water-soluble surface-active agent and 80% of the diester to 20% of the surface-active agent, the relative proportions providing water dispersibility at the stated dilution and temperature.

In the preferred embodiment of the invention, the relative proportions of the diester and water soluble agent within the ranges of proportions given above, will be such that the composition is dispersible in water at concentrations less than 0.5% and at a temperature of at least 140° F. It is to be understood that the proportions of the two components may be adjusted so that the composition will be dispersible in water in concentrations as low as 0.01% and at a temperature as high as 200° F.

Following are three tables which illustrate the features of the present invention. The tables show the wetting speed in seconds in Drave's wetting speed tests using varying proportions of a polyethyleneglycol diester and surface-active agents. The polyethyleneglycol diester is, in all three tables, the diester of caprylic acid and a polyethyleneglycol having an average molecular weight of 600 (in the tables, the diester is referred to as tridecaethylene polyglycol dicaprylate). In the first table, the diester is blended with an anionic surface-active agent; in the second, with a non-ionic surface-active agent; and in the third, with a cationic surface-active agent. In the tables and all the examples, the values were determined at 100° F., and, unless otherwise specified the percentages given are on a water-free basis.

In Example A of each table, the solution was cloudy and the diester had a tendency to come out of solution upon standing and it was, therefore, necessary to work with a freshly made sample. In other examples, there was no tendency for the diester to separate as an oil, even after long standing.

The following examples are intended to illustrate but not limit in any way the novel compositions of the present invention:

*Example 1.*—60 parts of the esterification product of one molecule hexaethylene glycol with two molecules caprylic acid were mixed with 40 parts of sodium dodecyl sulphate. The Drave's test showed the following wetting times:

0.5%, 1 second; 0.2%, 4 seconds.
0.1%, 13 seconds; 0.05%, 38 seconds.

*Example 2.*—80 parts of the esterification product of one molecule nonaethylene glycol with two molecules 2-ethyl hexylic acid were mixed with 20 parts of sodium dodecyl sulphate. The Drave's test showed the following wetting times:

0.5%, instantaneous; 0.2%, 4 seconds.
0.1%, 13 seconds; 0.05%, 44 seconds.

*Example 3.*—34 parts of the esterification product of one molecule polyethylene glycol of the average molecular weight 1000 with two molecules pelargonic acid were mixed with 66 parts of the sodium salt of sulphated isopropyl oleate. The Drave's test showed the following wetting times:

0.5%, 2 seconds; 0.2%, 5 seconds.
0.1%, 16 seconds; 0.05%, 26 seconds.

*Example 4.*—80 parts of the esterification product of one molecule polyethylene glycol of the average molecular weight 600 with two molecules of pelargonic acid were mixed with 20 parts of dilauroyltriethylene-tetramine-diacetate (a cation active agent prepared by heating 2 molecules of lauric acid with one molecule of triethylene

*Table 1*

| | A | B | C | D | E | F | G | H | I | J | K |
|---|---|---|---|---|---|---|---|---|---|---|---|
| Tridecaethylene polyglycol dicaprylate, percent | 100 | 90 | 80 | 70 | 60 | 50 | 40 | 30 | 20 | 10 | 0 |
| Sodium dodecyl sulphate, percent | 0 | 10 | 20 | 30 | 40 | 50 | 60 | 70 | 80 | 90 | 100 |
| Wetting time, seconds: | | | | | | | | | | | |
| 0.5% at 100° F | 7 | 2 | 1 | 1 | 2 | 2 | 4 | 4 | 5 | 8 | 12 |
| 0.2% at 100° F | 16 | 4 | 2 | 3 | 3 | 5 | 7 | 8 | 11 | 15 | 28 |
| 0.1% at 100° F | 67 | 9 | 6 | 7 | 7 | 8 | 15 | 15 | 15 | 20 | 49 |
| 0.05% at 100° F | 138 | 22 | 19 | 22 | 22 | 28 | 32 | 36 | 60 | 66 | 272 |

*Table 2*

| | A | L | M | N | O | P | Q | R | S | T | U |
|---|---|---|---|---|---|---|---|---|---|---|---|
| Tridecaethylene polyglycol dicaprylate, percent | 100 | 90 | 80 | 70 | 60 | 50 | 40 | 30 | 20 | 10 | 0 |
| Sorbitan monolaurate-ethylene oxide reaction product ("Tween" 20 of Atlas Powder Company), percent | 0 | 10 | 20 | 30 | 40 | 50 | 60 | 70 | 80 | 90 | 100 |
| Wetting Time, Seconds: | | | | | | | | | | | |
| 0.5% at 100° F | 7 | 0 | 0 | 0 | 2 | 0 | 2 | 3 | 5 | 14 | 22 |
| 0.2% at 100° F | 16 | 5 | 4 | 4 | 5 | 6 | 9 | 15 | 42 | 52 |
| 0.1% at 100° F | 67 | 11 | 10 | 9 | 11 | 14 | 14 | 17 | 24 | 72 | 217 |
| 0.05% at 100° F | 138 | 29 | 27 | 28 | 30 | 35 | 42 | 43 | 68 | 233 | over 300 |

0=instantaneous wetting.

*Table 3*

| | A | V | W | X | Y | Z | AA | BB | CC | DD | EE |
|---|---|---|---|---|---|---|---|---|---|---|---|
| Tridecaethylene polyglycol dicaprylate, percent | 100 | 90 | 80 | 70 | 60 | 50 | 40 | 32 | 20 | 10 | 0 |
| Lauroyloxyethyl dihydroxyethyl ammonium ethylsulphate, percent | 0 | 10 | 20 | 30 | 40 | 50 | 60 | 70 | 80 | 90 | 100 |
| Wetting time, seconds: | | | | | | | | | | | |
| 0.5% at 100° F | 7 | 3 | 1 | 2 | 2 | 2 | 2 | 3 | 3 | 4 | 6 |
| 0.2% at 100° F | 16 | 6 | 6 | 5 | 6 | 6 | 7 | 8 | 10 | 15 | 24 |
| 0.1% at 100° F | 67 | 13 | 15 | 15 | 15 | 16 | 17 | 22 | 36 | 49 | 68 |
| 0.05% at 100° F | 138 | 22 | 29 | 26 | 30 | 42 | 60 | 146 | 159 | over 300 | over 300 | tetramine to 160–190° C. until two molecules of water have split off and neutralizing the product with glacial acetic acid). The Drave's test showed the following wetting times:

0.5%, 2 seconds; 0.2%, 7 seconds.
0.1%, 19 seconds; 0.05%, 62 seconds.

*Example 5.*—66 parts of the esterification product of one molecule of polyethylene glycol of the average molecular weight of 600 with one molecule of 2-ethyl-butyric acid and 1 molecule of capric acid were mixed with 34 parts of sulphonated castor oil (75%). The Drave's test showed the following wetting times:

0.5%, 3 seconds; 0.2%, 10 seconds.
0.1%, 20 seconds; 0.05%, 134 seconds.

*Example 6.*—60 parts of the esterification product of one molecule nonaethylene glycol with one molecule of 2-ethyl hexylic acid and one molecule of pelargonic acid were mixed with 40 parts of the sodium salt of 3,9-diethyl 6-tridecanol sulphate. The Drave's test showed the following wetting times:

0.5%, instantaneously; 0.2%, 3 seconds.
0.1%, 7 seconds; 0.05%, 21 seconds.

*Example 7.*—Tridecaethylene glycol caprate-caprylate was mixed with an equal amount of the ethylene oxide addend of isooctyl phenol (containing on the average of 12 ethylene oxide units). The Drave's test showed the following wetting times:

0.5%, 1 second; 0.2%, 4 seconds.
0.1%, 8 seconds; 0.05%, 32 seconds

*Example 8.*—50 parts of the mixed ester of 2-ethyl butyric and 2-ethyl hexylic acid with nonaethylene glycol were mixed with 50 parts of sodium nonyl-naphthalene sulfonate (an anionic surface-active agent). The Drave's test showed the following wetting times:

0.5%, instantaneously; 0.2%, 3 seconds.
0.1%, 9 seconds; 0.05%, 30 seconds.

*Example 9.*—66 parts of an esterification product of 1 molecule 2-ethyl butyric acid and 1 molecule pelargonic acid with 1 molecule polyethylene glycol (average molecular weight 600) were mixed with 34 parts of sodium keryl benzene sulfonate (an anionic surface-active agent). The Drave's test showed the following wetting times:

0.5%, 3 seconds; 0.2%, 6 seconds.
0.1%, 18 seconds; 0.05%, 51 seconds.

*Example 10.*—95 parts of the esterification product of 1 molecule caprylic acid, 1 molecule 2-ethyl hexylic acid and 1 molecule polyethylene glycol (average molecular weight 600) were mixed with 5 parts of the sodium salt of di (2-ethyl hexyl) sulpho succinate. The Drave's test showed the following wetting times:

0.5%, instantaneously; 0.2%, 4 seconds.
0.1%, 7 seconds; 0.05%, 15 seconds.

*Example 11.*—80 parts of an esterification product of 2 molecules n-heptylic acid (oenantic acid) with one molecule of nonaethylene glycol were mixed with 20 parts sodium dodecyl sulfate (an anionic surface-active agent). The Drave's test showed the following wetting times:

0.5, 2 seconds; 0.2%, 4 seconds.
0.1%, 11 seconds; 0.05%, 41 seconds.

*Example 12.*—40 parts of nonaethylene glycol di-heptylate were mixed with 60 parts of the ethylene oxide addend of nonyl thiophenol (containing between 10 and 15 ethylene oxide units). The Drave's test showed the following wetting times:

0.5%, instantaneous; 0.2%, 2 seconds.
0.1%, 4 seconds; 0.05%, 14 seconds.

*Example 13.*—80 parts of an esterification product of 2 molecules delta-methyl caproic acid (also called isoamyl acetic acid) and 1 molecule of a polyethylene glycol of an average molecular weight of 600 were mixed with 20 parts of sodium dodecyl benzene sulphonate. The Drave's test showed the following wetting times:

0.5, instantaneously; 0.2%, 2 seconds.
0.1%, 7 seconds; 0.05%, 45 seconds.

*Example 14.*—60 parts of nonaethylene glycol-heptylate-delta-methyl caproate were mixed with 40 parts of sodium 2-methyl 7-ethyl 4-undecanol sulphate. The Drave's test showed the following wetting times:

0.5%, instantaneous; 0.2%, 1 second.
0.1%, 3 seconds; 0.05%, 10 seconds.

*Example 15.*—Nonaethylene glycol di-(2-ethyl hexylate) was mixed with an equal amount of water dispersible sodium petroleum sulphonate. The Drave's test showed the following wetting times:

0.5, 4 seconds; 0.2%, 9 seconds.
0.1%, 16 seconds; 0.05%, 40 seconds.

The Drave's test applied to the sodium petroleum sulphonate alone gave the following wetting times:

0.5%, 45 seconds; 0.2%, 131 seconds.
0.1%, no wetting power; 0.05%, no wetting power.

From the foregoing, it will be seen that there are a wide variety of materials and combinations that may be employed in accordance with the invention. In many cases, it will be desirable to employ a polyethylene glycol diester in which $R_1$ and $R_2$ are of equal length, for example 7, and in which the number of ethylene oxide averages 9 or 13. Typical examples of these are polyethylene glycol—dicaprylate or polyethylene glycol—di(2-ethylhexylate) in which the ethylene oxide units average 9 or 13. These esters may advantageously be employed with an anionic surface-active agent. Typical examples are a blend of polyethylene glycol di-caprylate having ethylene oxide units averaging 9 or 13 with a water-soluble sulphated alcohol of the type above listed or a blend of polyethylene glycol di(2-ethylhexylate) with a water-soluble salt of an alkylated naphthalene sulphonate of the type above set forth.

Considerable modification is possible in the selection of the surface-active agent and diester and in the various combinations thereof without departing from the essential features of the invention.

I claim:

1. As a wetting agent a blend of water-soluble surface-active agent and a polyethyleneglycol diester represented by the following formula:

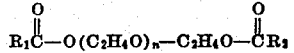

wherein n is a number from 5 to 22 inclusive, $R_1$ and $R_2$ are unsubstituted, saturated alkyl groups, the number of carbon atoms in $R_1$ plus the number of carbon atoms in $R_2$ being from 12 to 16 inclusive, and the difference between the number of carbon atoms in $R_1$ and in $R_2$ being no more than 4, the relative amounts of said water-soluble surface-active agent and diester, based on the combined weight thereof, being between 10% and about 95% of said polyethyleneglycol diester and between about 5% and 90% of said surface-active agent to provide a composition dispersible in water at concentrations less than about 2% and at a temperature of at least about 100° F.

2. The wetting agent of claim 1, wherein n is a number between 8 and 12 inclusive.

3. The wetting agent of claim 1, wherein $R_1$ and $R_2$ are alkyl groups containing the same number of carbon atoms.

4. The wetting agent of claim 1, wherein n is a number between 8 and 12 inclusive, and wherein $R_1$ and $R_2$ are alkyl groups containing the same number of carbon atoms.

5. The wetting agent of claim 4, wherein $R_1$ and $R_2$ are alkyl groups containing 7 carbon atoms.

6. The wetting agent of claim 1, wherein the water-soluble surface-active agent is of the anionic type.

7. The wetting agent of claim 6, wherein the water-soluble surface-active agent is a water-soluble salt of a sulphated aliphatic alcohol.

8. The wetting agent of claim 1, wherein the water-soluble surface-active agent is of the non-ionic type.

9. The wetting agent of claim 1, wherein the relative amounts of said surface-active agent and said diester, based on the combined weight thereof, are between 20% and 80% of the diester and between 80% and 20% of the surface-active agent to provide a composition dispersible in water at concentrations less than about .5% and at a temperature of at least about 140° F.

10. The wetting agent of claim 9, wherein the water-soluble surface-active agent is of the anionic type.

11. As a wetting agent a blend of polyethyleneglycol-dicaprylate, the number of ethylene oxide units averaging 9, and a water-soluble salt of a sulphated aliphatic alcohol, the relative amounts of the two components, based on the combined weight thereof, being between 10% and about 95% of the former and about 5% and 90% of the the latter, to provide a composition dispersible in water at concentrations less than about 2% and at a temperature of at least about 100° F.

12. As a wetting agent a blend of polyethyleneglycol-dicaprylate, the number of ethylene oxide units averaging 13, and a water-soluble salt of a sulphated aliphatic alcohol, the relative amounts of the two components, based on the combined weight thereof, being between 10% and about 95% of the former and about 5% and 90% of the latter, to provide a composition dispersible in water at concentrations less than about 2% and at a temperature of at least about 100° F.

13. As a wetting agent a blend of polyethyleneglycol-di(2-ethyl hexylate), the number of ethylene oxide units averaging 13, and a water-soluble salt of an alkylated naphthalene sulphonate, the relative amounts of the two components, based on the combined weight thereof, being between 10% and about 95% of the former and about 5% and 90% of the latter, to provide a composition dispersible in water at concentrations less than about 2% and at a temperature of at least about 100° F.

HANS GEORGE FIGDOR.

REFERENCES CITED

The following references are of record in the file of this patent:

UNITED STATES PATENTS

| Number | Name | Date |
|---|---|---|
| 2,174,760 | Schuette et al. | Oct. 3, 1939 |
| 2,269,529 | Goldsmith | Jan. 13, 1942 |
| 2,418,664 | Ramsey | Apr. 8, 1947 |